United States Patent
Bardhan

(10) Patent No.: US 9,329,751 B2
(45) Date of Patent: May 3, 2016

(54) METHOD AND A SYSTEM TO GENERATE A USER INTERFACE FOR ANALYTICAL MODELS

(71) Applicant: PREDICTIVE ANALYTICS SOLUTIONS PVT. LTD., Kacharakanahalli, Bangalore, Karnataka (IN)

(72) Inventor: Sumit Kumar Bardhan, Bangalore (IN)

(73) Assignee: PREDICTIVE ANALYSTICS SOLUTIONS PVT. LTD., Bangalore (IN)

( * ) Notice: Subject to any disclaimer, the term of this patent is extended or adjusted under 35 U.S.C. 154(b) by 468 days.

(21) Appl. No.: 13/824,891

(22) PCT Filed: Oct. 4, 2012

(86) PCT No.: PCT/IB2012/055329
§ 371 (c)(1),
(2) Date: Mar. 18, 2013

(87) PCT Pub. No.: WO2013/050958
PCT Pub. Date: Apr. 11, 2013

(65) Prior Publication Data
US 2014/0149895 A1    May 29, 2014

(30) Foreign Application Priority Data

Oct. 7, 2011 (IN) .............................. 3472/CHE/2011

(51) Int. Cl.
G06F 17/30 (2006.01)
G06F 7/00 (2006.01)
G06F 3/0481 (2013.01)

(52) U.S. Cl.
CPC ...... *G06F 3/04817* (2013.01); *G06F 17/30592* (2013.01)

(58) Field of Classification Search
CPC .................... G06F 17/30908; G06F 17/30914; G06F 17/2785
See application file for complete search history.

(56) References Cited

U.S. PATENT DOCUMENTS 7,558,726 B2 * 7/2009 Kraiss et al. ...................... 704/7
8,229,864 B1 * 7/2012 Lin et al. .......................... 706/11

(Continued)

OTHER PUBLICATIONS

Mar. 4, 2013 Search Report issued in International Patent Application No. PCT/IB2012/055329.

(Continued)

*Primary Examiner* — Jeffrey A Burke
(74) *Attorney, Agent, or Firm* — Oliff PLC

(57) ABSTRACT

Embodiments relate to a method to dynamically generate a user interface for computing a prediction on analytical models. The analytical models received from a computing device are parsed by a processor of a server to extract a plurality of analytical metadata and the extracted plurality of analytical metadata is stored in a set of metadata tables. Analytical relationship information from the one or more analytical models is extracted for scoring using the stored plurality of analytical metadata and is stored in a set of relationship tables created by the processor. The user interface is generated using the stored plurality of analytical metadata and displayed on computing device for receiving one or more inputs for each of the data entry fields from a user. The prediction is computed by applying the stored analytical relationship information on the received one or more inputs and displaying the computed prediction on the user interface.

13 Claims, 9 Drawing Sheets

(56) References Cited

U.S. PATENT DOCUMENTS

| | | | |
|---|---|---|---|
| 8,370,279 B1* | 2/2013 | Lin et al. .................... | 706/12 |
| 8,583,576 B1* | 11/2013 | Lin et al. .................... | 706/21 |
| 2004/0230467 A9 | 11/2004 | Gailey et al. | |
| 2004/0236758 A1 | 11/2004 | Medicke et al. | |
| 2005/0096950 A1 | 5/2005 | Caplan et al. | |
| 2005/0273462 A1 | 12/2005 | Reed et al. | |
| 2011/0141136 A1 | 6/2011 | Cardno et al. | |

OTHER PUBLICATIONS

Mar. 4, 2013 Written Opinion issued in International Patent Application No. PCT/IB2012/055329.

* cited by examiner

METHOD AND A SYSTEM TO GENERATE A USER INTERFACE FOR ANALYTICAL MODELS

CROSS-REFERENCE TO RELATED APPLICATION

The present application claims priority to Indian patent application serial number 3472/CHE/2011 filed on Oct. 7, 2011, the entire contents of which are incorporated by reference.

TECHNICAL FIELD

Embodiments of the present disclosure relates to web-based predictive analytics. More particularly, embodiments of the present disclosure relates to a method and a system for dynamically generating a user interface to compute a prediction on analytical models.

BACKGROUND OF THE DISCLOSURE

Analytical models, such as predictive analytical models conventionally may be used to analyze data in a data warehouse. In conventional systems, scoring of records against a predictive model is provided by a scoring engine. Such application of a predictive model to a database record may be provided, for example, through the use of a Predictive Model Mark-up Language (PMML) file that defines the application of a model to data. However, invocation of these PMML files is typically platform and/or system dependent such that the necessary operations to invoke a predictive model in one platform and/or system may not function to invoke the predictive model in a different platform and/or system. Thus, models and/or PMML files may be platform and/or system specific, which may reduce the ability to provide best-practices models that may be deployed across different platforms and/or systems.

Conventional applications typically need to maintain direct interfaces to the analytical engines when providing real-time customer data or when requesting the execution of analytical tasks. In maintaining these interfaces, the applications are required to have detailed knowledge of the specific types of analytical engines and/or data mining models that are used. The applications will typically exchange input data directly with these analytical engines, and this data often has specialized formats that are associated with the specific types of analytical tasks to be executed. For example, the applications may need to provide input data of a particular type for the execution of prediction tasks, but may need to provide other forms of input data for the execution of analytical tasks of a different type.

Further, conventional method offers statistical functionality along with work flow automation. However it does not provide the ability to dynamically build a user input screen from PMML Models. Also, the existing method provides model scoring as a cloud service but does not provide dynamic UI creation Therefore, there is a need to provide a method and a system to deploy predictive analytical models.

SUMMARY

The shortcomings of the prior art are overcome through the provision of a method and a system as described in the description.

A method to dynamically generate a user interface for computing a prediction on analytical models is disclosed in the embodiments of the present disclosure. The method comprises steps of receiving one or more analytical models by a server from a computing device. Next, the received analytical models are parsed by a processor associated with the server to extract a plurality of analytical metadata. The processor creates a set of metadata tables to store the extracted plurality of analytical metadata. Later, analytical relationship information from the one or more analytical models is extracted using the stored plurality of analytical metadata required for scoring the analytical model. The processor creates a set of relationship tables to store the extracted analytical relationship information. At this stage, the user interface comprising a plurality of data entry fields is generated using the stored plurality of analytical metadata and then the generated user interface is displayed on the computing device where one or more inputs for each of the data entry fields are received from a user. Now, the analytical model is scored for computing the prediction by applying the stored analytical relationship information on the received one or more inputs and the computed prediction are displayed on the user interface.

An embodiment of the present disclosure discloses a system to dynamically generate a user interface for computing a prediction on analytical models. The system comprises a server, a processor associated to the server, a memory unit coupled to the processor and a computing device. The server is configured to receive one or more analytical models from the computing device. The processor, in response to the receipt of one or more analytical model, is configured to parse the analytical models to extract a plurality of analytical metadata and create a set of metadata tables and a set of relationship tables. The created set of metadata tables and the set of relationship tables are stored in the memory unit. The extracted plurality of analytical metadata is stored in the set of metadata tables. Later, analytical relationship information from the one or more analytical models is extracted using the stored plurality of analytical metadata required for scoring. The extracted analytical relationship information is stored in the set of relationship tables. Next, the user interface comprising a plurality of data entry fields is generated using the stored plurality of analytical metadata and is displayed on the computing device for receiving one or more inputs provided by a user for each of the data entry fields. The analytical model is scored for computing the prediction by applying the stored analytical relationship information on the received one or more inputs. The computed prediction is displayed on the user interface of the computing device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The features of the present disclosure are set forth with particularity in the appended claims. The disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
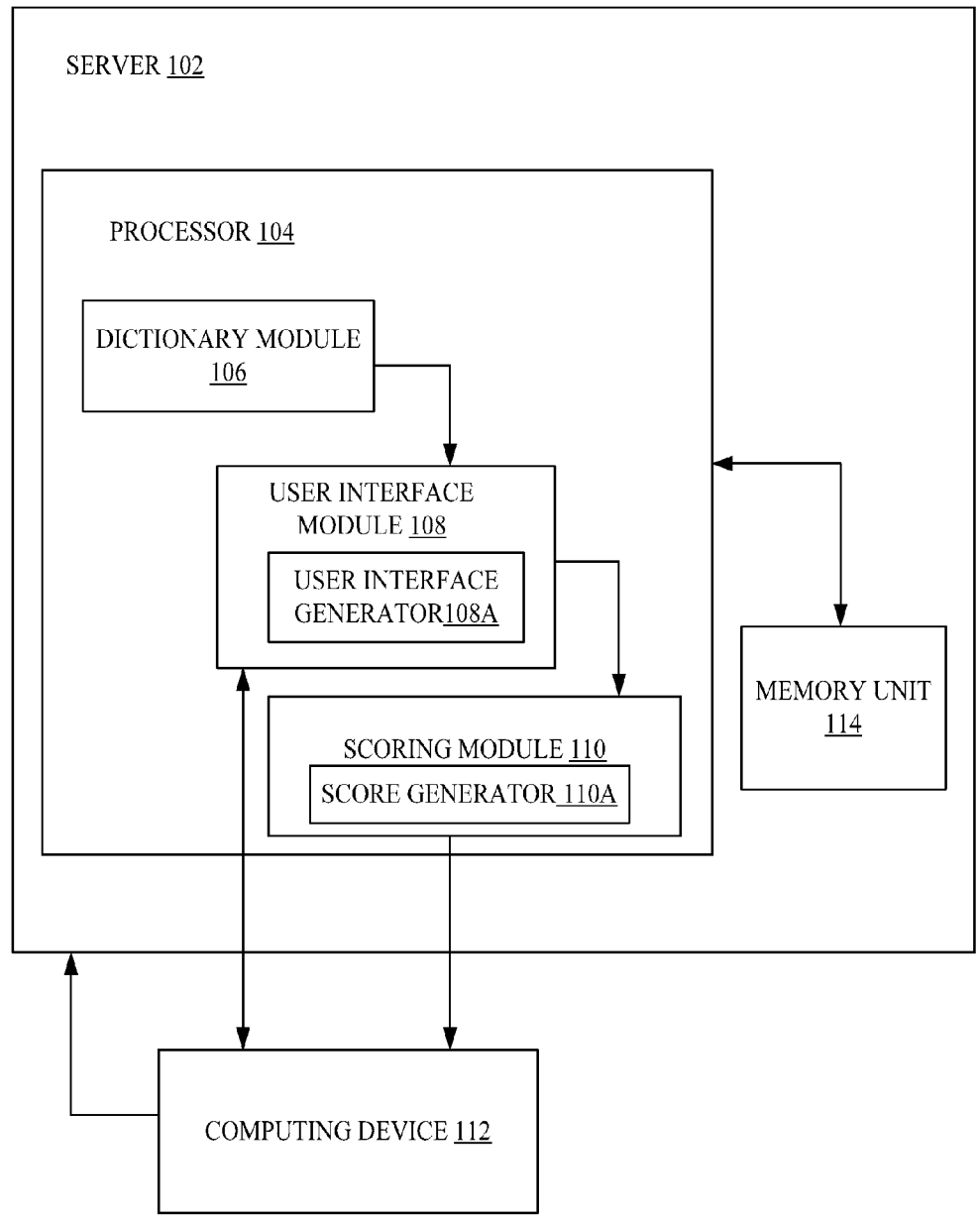
FIG. 1 illustrates an exemplary system to dynamically generate a user interface for computing a prediction on analytical models according to an embodiment of the present disclosure.

FIG. 1 illustrates an exemplary system to dynamically generate a user interface for computing a prediction on analytical models according to an embodiment of the present disclosure. The system comprises a server 102 for receiving one or more analytical models from a computing device 112 over a network. The network(s) may comprise a public network e.g., the Internet, World Wide Web, etc. or private network e.g., local area network (LAN), etc. or combinations thereof e.g., a virtual private network, LAN connected to the Internet, etc. Furthermore, the network(s) need not be a wired network only, and may comprise wireless network elements as known in the art. The computing device can be selected from at least one of a computer, a mobile phone, a Personal Digital Assistants (PDA), and any device capable of performing data transmission and displaying. Embodiments of the present disclosure may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, network PCS, minicomputers, mainframe computers, and the like. The server 102 comprises a processor 104 and a memory unit 114 coupled to the processor 104.

The processor 104 receives one or more analytical model and parses the received analytical models to extract a plurality of analytical metadata. The processor 104 creates a set of metadata tables and a set of relationship tables after parsing the analytical models. The created set of metadata tables and relationship tables are stored in the memory unit 114 by the processor 104. The extracted plurality of analytical metadata is stored in the set of metadata tables. The processor 104 comprises a dictionary module 106, a user interface module 108 having a user interface generator 108A and a scoring module 110 having a score generator 110A. The dictionary module 106 is configured to extract analytical relationship information from the one or more analytical models required for scoring. The dictionary module 106 is further configured to store the extracted analytical relationship information in the set of relationship tables. The user interface generator 108A of the user interface module 108 generates a user interface comprising a plurality of data entry fields by using the stored plurality of analytical metadata. Then, the generated user interface is displayed on the computing device 112 by the user interface generator 108A. The computing device 112 displays the generated user interface for receiving one or more inputs for each of the data entry fields from a user. The score generator 110A of the scoring module 110 scores the analytical model to compute the prediction by applying the stored analytical relationship information on the received one or more inputs. The score generator 110A displays the computed prediction on the user interface of the computing device 112.

Figure 2:
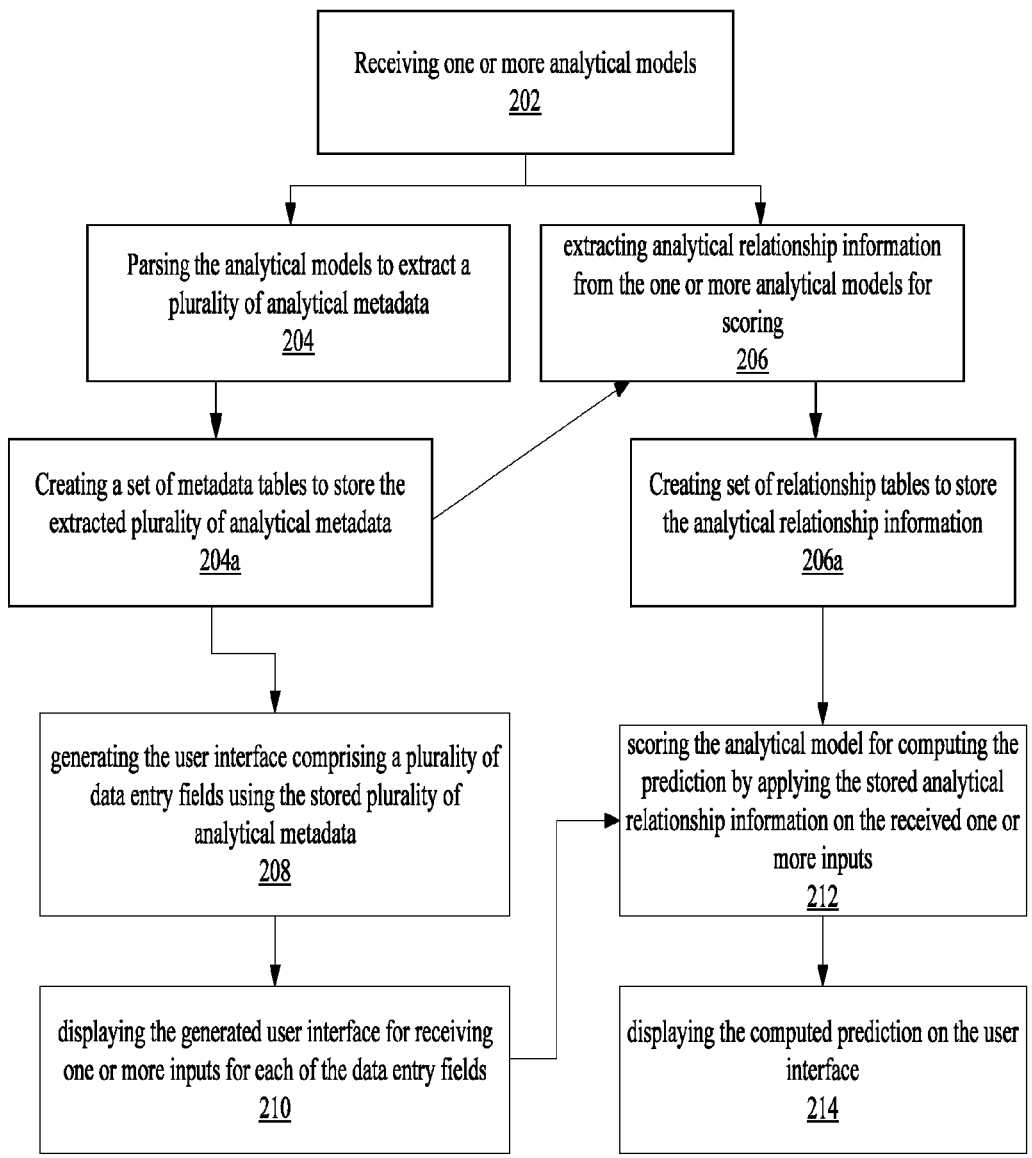
FIG. 2 illustrates an exemplary method used to dynamically generate a user interface for computing a prediction on analytical models according to an embodiment of the present disclosure.

FIG. 2 illustrates an exemplary method to dynamically generate a user interface for computing a prediction on analytical models according to an embodiment of the present disclosure. The method comprises steps of receiving one or more analytical models by a server 102 from a computing device 112 at step 202. The analytical model include but not limiting to a Predictive Model Mark-up Language (PMML) model, which is generated using one of the various statistical software tools including but not limited to a Statistical Packages for Social Sciences (SPSS), Statistical Analysis System (SAS) and R model. At step 204, the analytical models are parsed by the processor 104 associated with the server 102 in order to extract a plurality of analytical metadata. A set of metadata tables are created at step 204a to store the extracted plurality of analytical metadata. The set of metadata tables are in turn stored in the memory unit 114. The plurality of analytical metadata comprises a plurality of variables with their dictionary information. The dictionary module 106 reads the one or more analytical models and extracts analytical relationship information from the read one or more analytical models using the stored plurality of analytical metadata at step 206. The analytical relationship information consists of a mathematical relationship information and logical relationship information. The extracted analytical relationship information is stored in a set of relationship tables created by the processor at step 206a which is used for scoring. Scoring is a method used to estimate the likelihood of the predictive outcomes. The set of relationship tables are stored in the memory unit 114. The user interface comprising a plurality of data entry fields is generated by the user interface module 108 at step 208 using the stored plurality of analytical metadata and is displayed on the computing device 112 for receiving one or more inputs for each of the data entry fields from a user at step 210. The one or more inputs are provided by the user on the computing device 112 and the provided one or more inputs are fed to the scoring module 110 through the user interface module 108. The one or more inputs are entered using a keyboard or other input means attached to the computing device 112. The score generator 110A of the scoring module 110 scores the analytical model for computing the prediction by applying the stored analytical relationship information on the received one or more inputs illustrated at step 212. At step 214, the score generator 110A displays the computed prediction on the user interface of the computing device 112.

Figure 3:
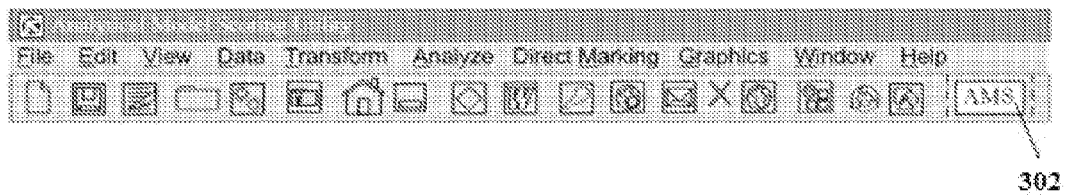
FIG. 3 illustrates an exemplary server application installed in an analytical platform according to an embodiment of the present disclosure.

FIG. 3 illustrates an exemplary server application installed in an analytical platform according to an embodiment of the present disclosure. The server application denoted by "Analytical Model Scoring (AMS)" icon 302 can be installed on the computing device 112 and then integrated with the analytical platform's menu bar. The server application 302 authenticates the user, and then pushes the current analytical output as a Hyper Text Mark-up Language (HTML) file to the server 102. The server 102 provides the analytical output which is available as a web page for viewing and for editing.

Figure 4A:
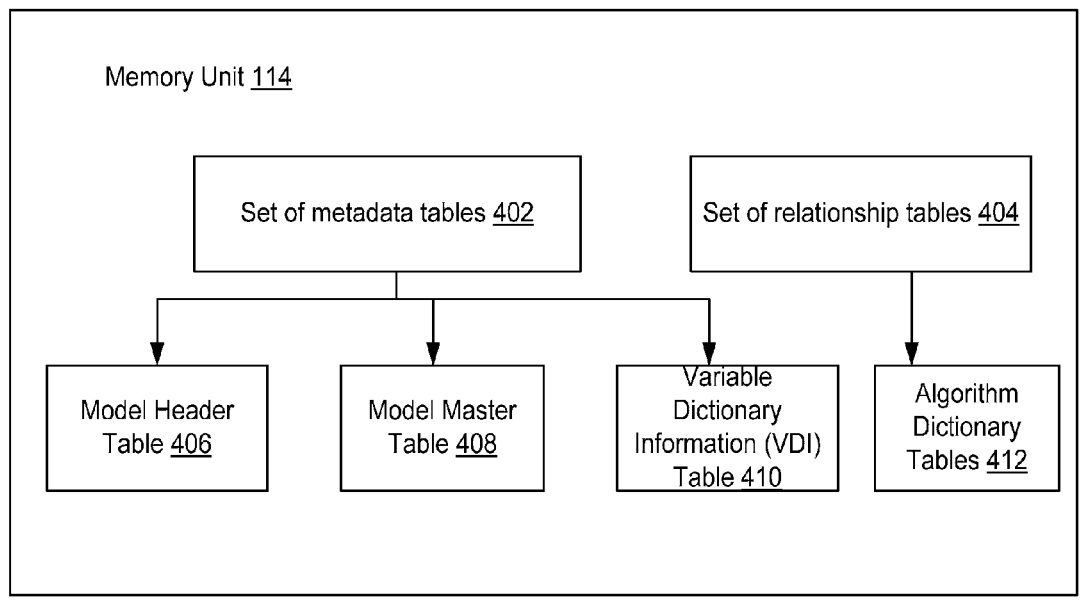
FIG. 4a illustrates a set of metadata tables and a set of relationship tables created by a processor according to an embodiment of the present disclosure.

FIG. 4a illustrates a set of metadata tables 402 and a set of relationship tables 404 created by the processor 104 according to an embodiment of the present disclosure. The set of metadata tables 402 and the set of relationship tables 404 are stored in the memory unit 114 coupled to the processor 104. By way of example, the memory unit 114 includes but not limiting to computer readable media which comprises RAM, ROM, EEPROM, CD-ROM or other optical disk storage, magnetic disk storage or other magnetic storage devices, or any other medium which can be used to store information related to analytical model. The set of metadata tables 402 stores plurality of analytical metadata extracted by processor 104 by parsing the analytical model. The set of metadata tables 402 comprises Model Header Table 406, Model Master Table 408 and Variable Dictionary Information (VDI) table 410. The Model Header Table 406 stores model header information identifying the platform used to create the PMML model and the PMML version of the PMML model. The Model Master Table 408 stores Model Identification Information (MII) which identifies the algorithm used to generate the PMML model and the application of the PMML model. The Variable Dictionary Information (VDI) table 410 stores variables along with their dictionary information read from the PMML model by the processor 104 required for the scoring the PMML model. The set of relationship tables 404 stores analytical relationship information extracted from the PMML models using stored analytical metadata. The set of relationship tables 404 comprises Algorithm Dictionary Tables 412 storing the extracted analytical relationship information.

Figure 4B:
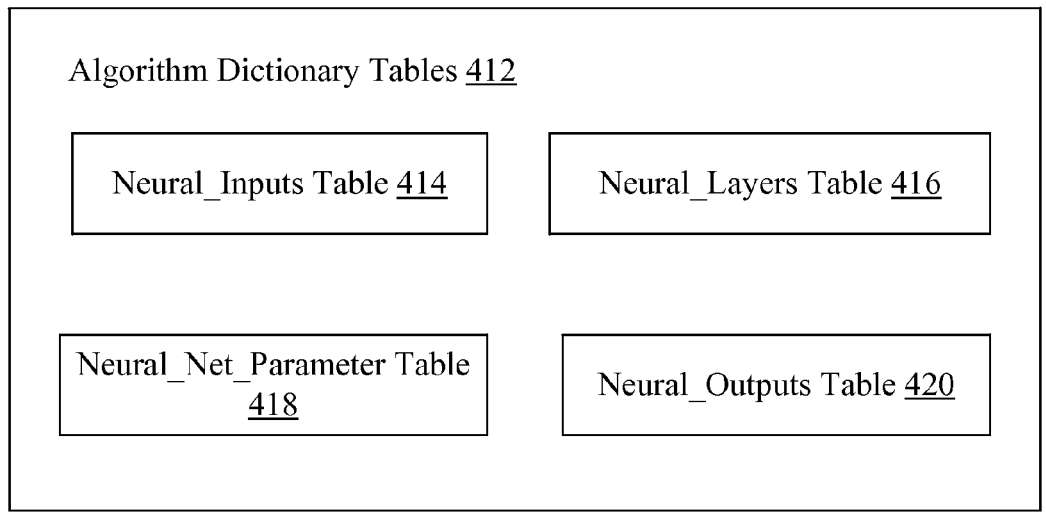
FIG. 4b illustrates an exemplary set of tables of the Algorithm Dictionary Tables (ADT) of neural networks according to an embodiment of the present disclosure.

FIG. 4b illustrates ADT 412 of Neural Networks as an example according to an embodiment of the present disclosure. The names and the structure of these tables will vary with algorithm type, since mathematical and computational logic is algorithm dependant.

| Table Name | Purpose |
| --- | --- |
| Neural_Inputs 414 | Stores metadata of input values and input parameter to neuron mapping |
| Neural_Layers 416 | Stores the values for the computation parameters between neural layers |
| Neural_Net_Parameter 418 | Stores the values for the computation parameters for individual layers |
| Neural_Outputs 420 | Maps the results of the computed output of the neural network to target parameters |

The Algorithm Dictionary Tables 412 is called up which reads through the PMML file. Once the model is identified as Neural Network Model (illustrated as an example), the corresponding dictionary generator which picks the values from the PMML file and inserts the same in to the Neural Network model's Neural_Inputs tables 414, Neural_Layers tables 416, Neural_Outputs tables 420 and Neural Net_Parameter tables 418. For example, it picks up the values from the Neural_Inputs tag of the PMML model and inserts the same into the Neural_Inputs tables 414. The Neural_Inputs tables 414 contains tuple of "Neural_Inputs_id", "Model_id", "Neuron_id", "optye", "datatype", "Field_Ref" and "value" fetched from the Neural_Inputs tag.

Neural_Inputs Table 414 Structure is Given Below:

TABLE 1

| Column name | Definition |
| --- | --- |
| Neural_Inputs_id | serial NOT NULL |
| Model_id | integer |
| Neuron_Id | integer |
| optype | character varying(255) |
| dataType | character varying(255) |
| Field_Ref | character varying(255) |
| value | character varying(255) |

It then reads the values of the NeuralLayers tag, and NeuralOutputs tag writes them into the Neural_Layers tables 416 and Neural_Outputs tables 420 respectively. The Neural_Layers tables 416 contains a tuple of "Neural_Layers_id", "Model_id", "Layer", "Neuron_id" etc. fetched from NeuralLayers tag.

Neural_Layers Table 416 Structure is Given Below:

TABLE 2

| Column name | Definition |
| --- | --- |
| Neural_Layers_id | serial NOT NULL |
| Model_id | integer |
| Layer | character varying(255) |
| Neuron_id | integer |
| bias | double precision |
| Form_neuron_id | integer |
| weight | double precision |

The Neural_Outputs tables 420 contains tuple of "Neural_Outputs_id", "Model_id", "Neuron_id" etc.

Neural_Outputs Table 420 Structure is Given Below:

TABLE 3

| Column name | Definition |
| --- | --- |
| Neural_Outputs_id | serial NOT NULL |
| Model_id | integer |
| Neuron_id | integer |
| optype | character varying(255) |
| datatype | character varying(255) |
| Field_Ref | character varying(255) |
| value | character varying(255) |

It reads the hidden layer and output Neural Layer tag details such as activation function, normalization method and writes into the Neural Net_Parameter table 418.
Neural_Net_Parameter Table 418 Structure is Given as:

TABLE 4

| Column name | Definition |
| --- | --- |
| Neural_Net_id | serial NOT NULL |
| Model_id | integer |
| Hidden_Activation | character varying(255) |
| Output_Activation | character varying(255) |
| Normalizatio_Method | character varying(255) |

Figure 4C:
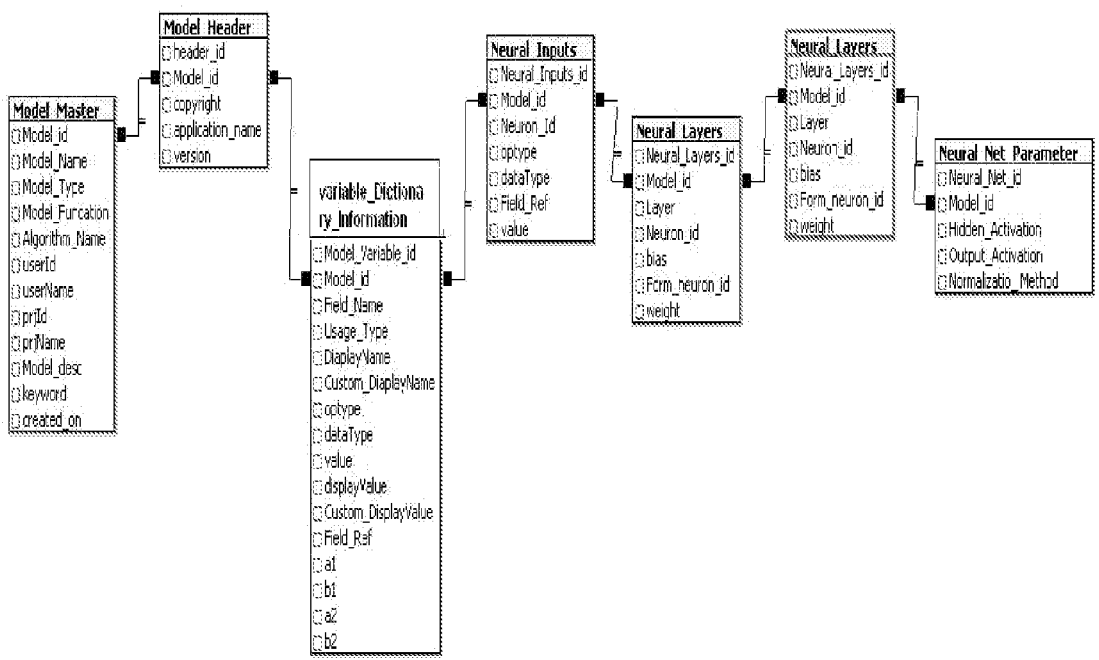
FIG. 4c illustrates table relationship according to an embodiment of the present disclosure.

The information contained in the PMML file is extracted into multiple tables, the relationship between which is shown in FIG. 4c for the specific case of a Neural Network Model.

Figure 5:
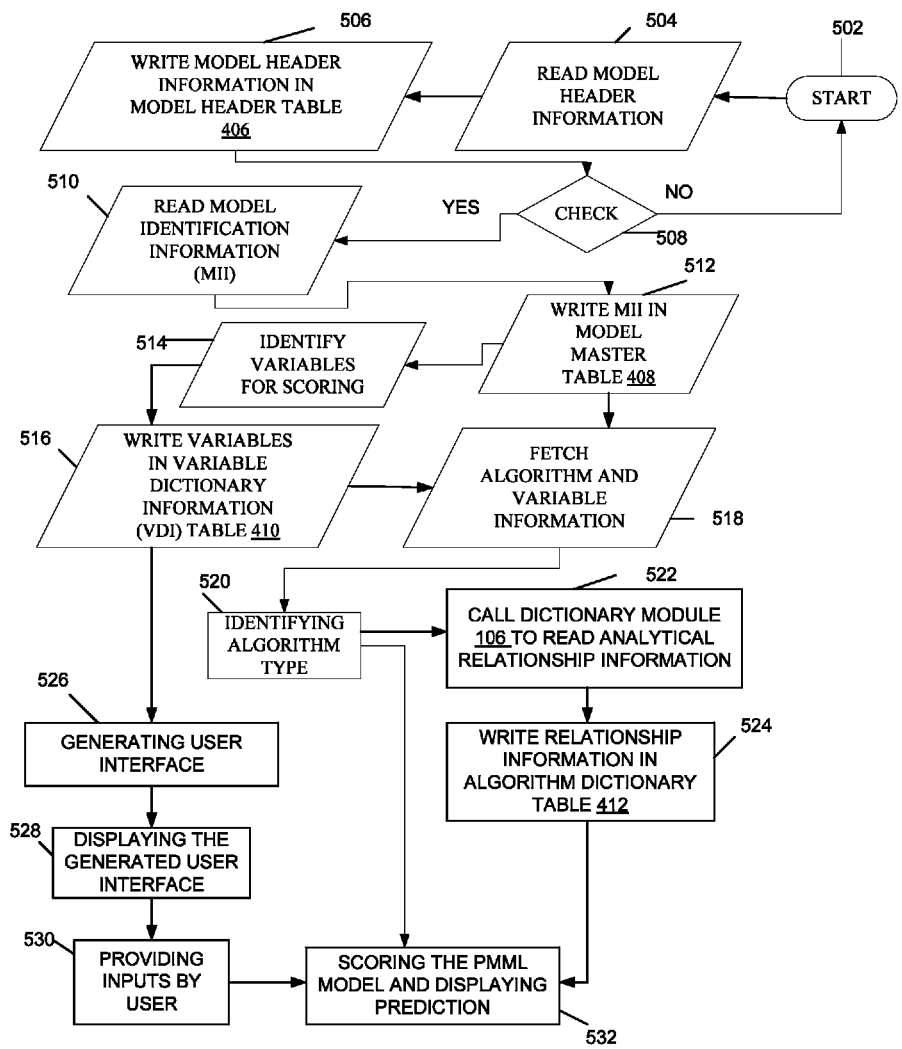
FIG. 5 illustrates a method of generating a user interface on a computing device for performing prediction on an analytical model according to an embodiment of the present disclosure.

FIG. 5 illustrates a method of generating a user interface on the computing device 112 for performing prediction on the analytical model according to an embodiment of the present disclosure. The method starts at step 502. The one or more analytical models such as Predictive Model Markup Language (PMML) model is received by the server 102 from the computing device 112.

As the PMML models are received by the server 102, each PMML model is parsed by the processor 104. The processor 104 parses the PMML model and reads model header information at step 504. The model header information identifies the platform that created the PMML model and the PMML version that are read from the PMML model. The read model header information is then written into the Model Header Table 406 at step 506. The compatibility between the received PMML model and the read model header information is checked at step 508. If compatibility does not match then the process again starts with step 502 until the compatibility is matched. If compatibility is matched, then Model Identification Information (MII) is read from the PMML file at step 510. The MII identifies the algorithm that generated the PMML model and reads the application of the PMML model. The read MII is written into the Model Master Table 408 at step 512. A plurality of variables with their dictionary information are identified from the Model Master Table 408 at step 514 which are required for scoring the PMML model. The plurality of variables is the plurality of analytical metadata. Then, the identified plurality of variables is written into the Variable Dictionary Information (VDI) Table 410 at step 516.

From the Model Master Table 408 and the VDI table 410, an algorithm and other variable information relating to the PMML model are fetched at step 518. Next, an algorithm type is identified at step 520. The algorithm type is a type of the algorithm that generated the PMML model.

Based on the identified algorithm type, an appropriate dictionary module 106 is called to extract the analytical relationship information from the VDI table 410 at step 522 relating to the PMML model. The extracted analytical relationship information is written into the Algorithm Dictionary Tables (ADT) 412 at step 524.

The user interface generator 108A of the user interface module 108 retrieves the variable information from the VDI table 410 to generate the user interface relating to the PMML model at step 526 and user interface generator 108A displays the generated user interface on the computing device 112 with the data entry fields related to the variable information retrieved from the VDI table 410 illustrated at step 528.

Figure 6:
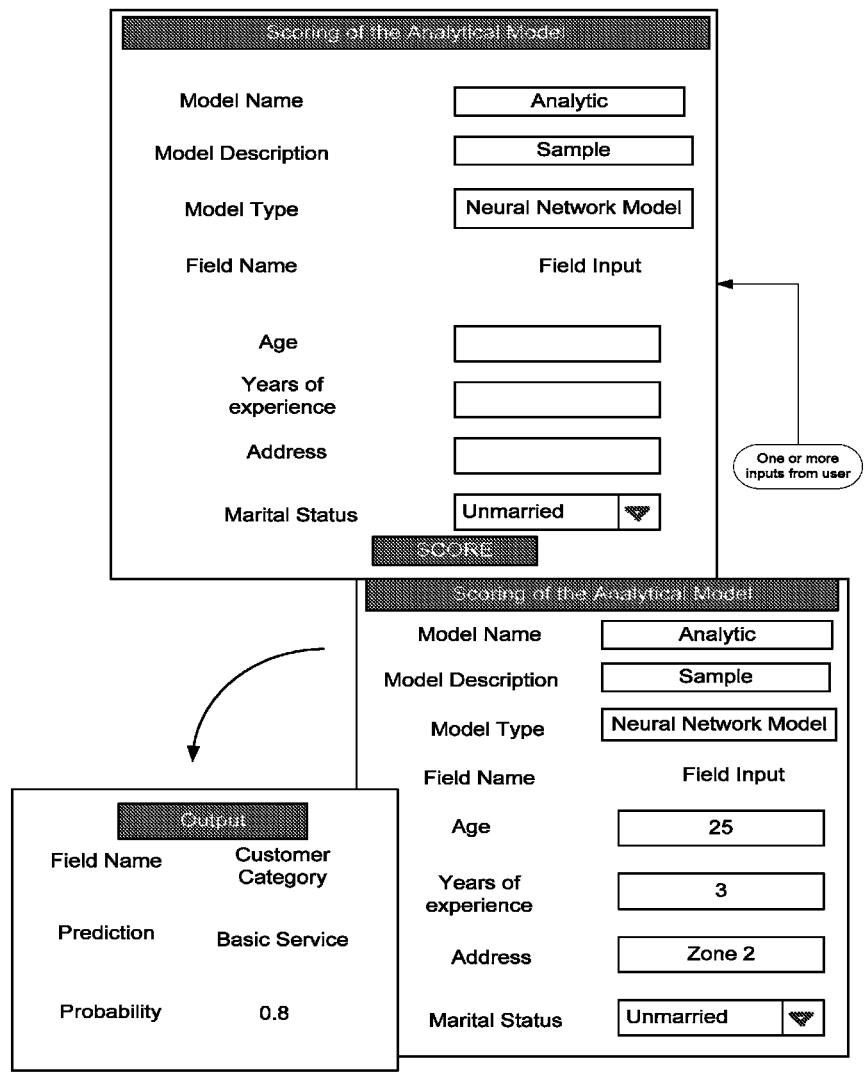
FIG. 6 shows an exemplary user interface generated on computing device according to an embodiment of the present disclosure.

Now, the one or more inputs from the user are provided to the computing device 112 at step 530 for each of the data entry fields on the displayed user interface. An exemplary user interface comprising data entry field is shown in FIG. 6. The one or more inputs are retrieved by the user interface module 108 and are passed to the scoring module 110 for scoring the PMML model. The score generator 110A of the scoring module 110 computes the prediction by applying the analytical relationship information stored in the ADT 412 on the received one or more inputs. Once the computation of prediction is completed by the score generator 110A, the output of the computed prediction is provided to the user interface and the computing device 112 displays the computed prediction output at step 532.

FIG. 6 shows the exemplary user interface generated on the computing device 112 according to an embodiment of the present disclosure. Subsequent to the PMML model being received by the server 102, the Model Master Table 408 is created and, the Server 102 identifies the algorithm type via the Model Master Table 408. Based on the algorithm type being identified, the corresponding dictionary module 106 is called.

For example, if the algorithm type identified from the Model Master Table 408 is neural networks, then the dictionary module 106 relating to the neural networks is called.

The dictionary module 106 reads the PMML model containing Neural_Inputs tag, Neural_Layers tag, Neural_Net_Parameter tag and Neural_Outputs tag which are used to extract the analytical relationship information of the PMML model. The ADT 412 comprises Neural_Inputs tables 414, Neural_Layers tables 416, Neural_Outputs tables 420 and Neural Net_Parameter tables 418 are written with the values fetched from the Neural_Inputs tag, Neural_Layers tag, Neural_Net_Parameter tag and Neural_Outputs tag.

The variables in the VDI table 410 fetched from the Model Master Table 408 are used by the user interface module 108. For example, the variables are used to generate the user interface having plurality of data entry fields such as "age", "years of experience", "address", and "marital status" etc as illustrated in the FIG. 6. Now, the user provides one or more inputs to each of the data entry data fields such as user gives input to the data entry field "age" with "25", "years of experience" with "3", "address" with "zone 2" and "marital status" with "unmarried". Each input provided is used by the score generator 110A. The score generator 110A applies the values of the ADT 412 on to the input received to compute the prediction. Once computing the prediction is completed, the scoring module 110 provides the computed prediction on the user interface of the computing device 112.

Figure 7:
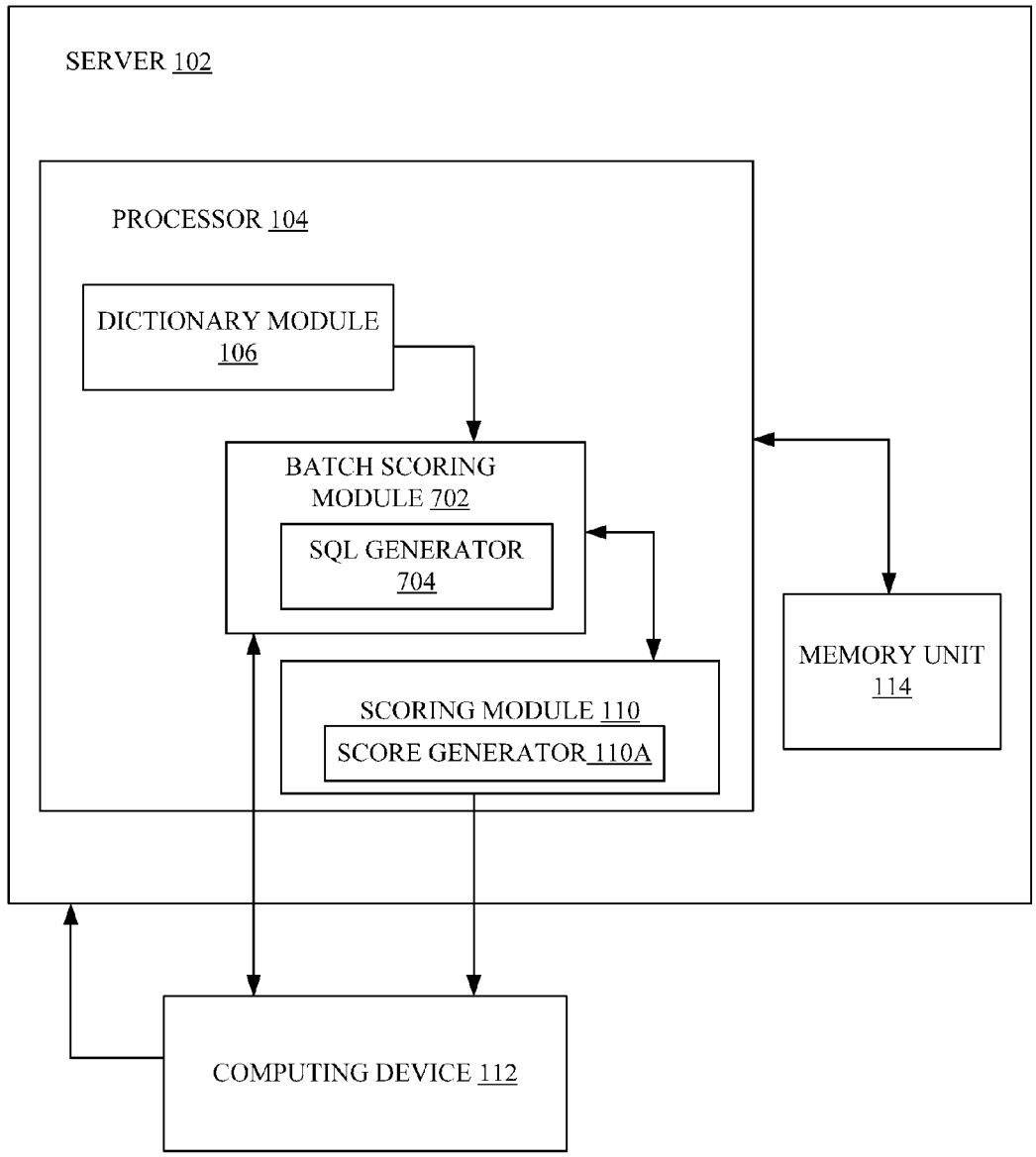
FIG. 7 illustrates an exemplary system to perform batch scoring of analytical model according to an embodiment of the present disclosure.

FIG. 7 illustrates an exemplary system to perform batch scoring of the one or more analytical model according to an embodiment of the present disclosure. The system comprises the server 102 for receiving the one or more analytical models and a data source associated to the one or more analytical models from the computing device 112. The one or more analytical models are provided by the user. The analytical model include but not limiting to a Predictive Model Mark-up Language (PMML) model. The data sources are at least one of a Relational Database Management Systems (RDBMS), a flat file, an Excel file and Java Database Connectivity (JDBC) data source. The processor 104 has dictionary module 106, a batch scoring module 702 comprising Structured Query Language (SQL) generator 704 and the scoring module 110 with score generator 110A. The scoring module 110 scores the one or more analytical models using the stored plurality of analytical metadata i.e. using variables with their dictionary information from the VDI tables 410 and analytical relationship information from ADT tables 412. The scoring module 110 extracts the stored analytical relationship information based on the algorithm type of the analytical models. The SQL generator 704 generates a Structured Query Language (SQL) structure using the extracted analytical relationship information for computing the prediction on the received one or more data sources and displays the computed prediction on the computing device 112.

Figure 8:
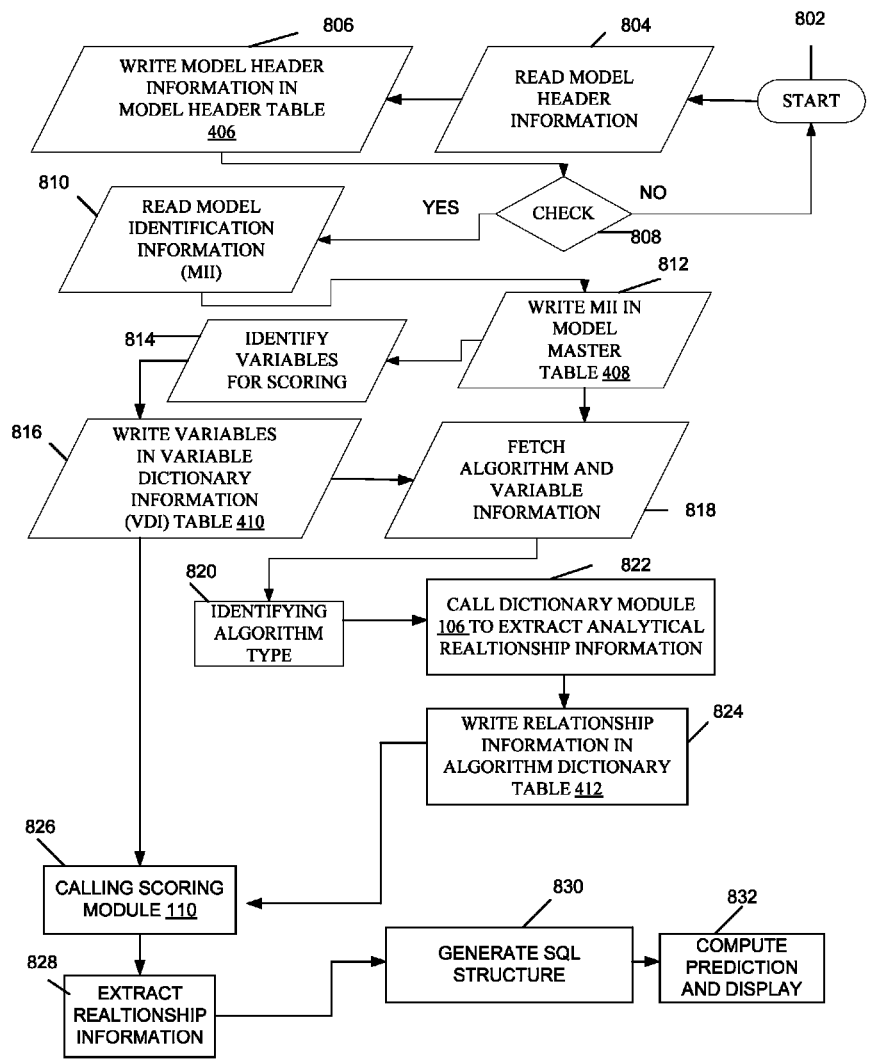
FIG. 8 illustrates batch scoring of analytical models according to an embodiment of the present disclosure.

FIG. 8 illustrates batch scoring of the one or more analytical models according to an embodiment of the present disclosure. The method starts at step 802, wherein the one or more analytical models and one or more data sources associated to the one or more analytical models are provided by the user to the server 102. The data sources are at least one of a Relational Database Management Systems (RDBMS), a flat file, an Excel file and Java Database Connectivity (JDBC) data source. The data source has a structure similar to the one used to create the PMML model using various statistical or machine learning software. The processor 104 parses the analytical model and reads model's header information at step 804. The read model header information is written into the Model Header Table 406 at step 806. The compatibility between the received analytical models and the read model header information is checked. If compatibility is not a match then the process again starts with step 802 until the compatibility is matched. If compatibility is a match then, Model Identification Information (MII) is read from the PMML file at step 810. The MII identifies the algorithm that generated the PMML model and reads the application of the PMML model. The read MII is written into the Model Master Table 408 at step 812. A plurality of variables with their dictionary information are identified from the Model Master Table 408 at step 814 required for scoring or for computing the prediction on the received data sources. The variables are the analytical metadata which are written into the Variable Dictionary Information (VDI) Tables 410 at step 816. From the Model Master Table 408 and the VDI table 410, an algorithm and other variable information relating to the received analytical model is fetched at step 818. Next, an algorithm type is identified from the fetched algorithm and variable information in the step 820. Based on the identified algorithm type, an appropriate dictionary module 106 is called. The dictionary module 106 extracts the analytical relationship information in the step 822 from the PMML model and writes the extracted analytical relationship information into the Algorithm Dictionary Tables (ADT) 412 at step 824. Now, the scoring module 110 is called at step 826 to extract the analytical relationship information from ADT tables 412 corresponding to the received one or more analytical models using the stored plurality of analytical metadata i.e. using variables with their dictionary information from the VDI tables 410. The scoring module 110 extracts analytical relationship information from the ADT 412 at step 828 and passes the read analytical relationship information to the Structured Query Language (SQL) generator 704. The SQL generator 704 generates a SQL structure using the analytical relationship information at step 830 and runs the generated SQL structure on the received one or more data sources received at step 802 to compute the prediction at step 832. The SQL generator 704 computes the prediction on the data sources and provides the computed prediction to the computing device 112 to store and display.

Aspects of the present disclosure are suitable for use in a variety of distributed computing system environments. In distributed computing environments, tasks may be performed by remote computer devices that are linked through communications networks. Embodiments of the present disclosure may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, network PCS, minicomputers, mainframe computers, and the like.

The methodology disclosed in the present disclosure will be described in the general context of computer-executable instructions, such as program modules, that are executed by a personal computer or a server. Generally, program modules include routines, programs, objects, components, data structures, etc., that perform particular tasks or implement particular abstract data types. Typically the functionality of the program modules may be combined or distributed as desired in various environments.

Embodiments within the scope of the present disclosure also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art

| Reference Table: | |
|---|---|
| Reference Numerals | Description |
| Server | 102 |
| Processor | 104 |
| Dictionary Module | 106 |
| User Interface Module | 108 |
| User Interface Generator | 108A |
| Scoring Module | 110 |
| Score Generator | 110A |
| Computing Device | 112 |
| Memory Unit | 114 |
| Server application "AMS" Icon | 302 |
| Set of metadata tables | 402 |
| Set of relationship tables | 404 |
| Model Header Table | 406 |
| Model Master Table | 408 |
| Variable Dictionary Information (VDI) Table | 410 |
| Algorithm Dictionary Table (ADT) | 412 |
| Neural_Inputs Table | 414 |
| Neural_Layers Table | 416 |
| Neural_Net_Parameter Table | 418 |
| Neural_Outputs Table | 420 |
| Batch Scoring Module | 702 |
| Structured Query Language (SQL) Generator | 704 |

The invention claimed is:

1. A method comprising:
receiving one or more analytical models, by a processor of a server, from a computing device;
parsing the received one or more analytical models, by the processor, to extract a plurality of analytical metadata;
creating, by the processor, a set of metadata tables to store the extracted plurality of analytical metadata;
extracting analytical relationship information from the one or more analytical models based on the stored plurality of analytical metadata;
creating, by the processor, a set of relationship tables to store the extracted analytical relationship information;
dynamically generating a user interface comprising a plurality of data entry fields based on the stored plurality of analytical metadata;
displaying the generated user interface on display of the computing device;
receive, from a user of the computing device, one or more user inputs for each of the data entry fields of the dynamically generated user interface;
compute a prediction based on a scoring of the analytical model by applying the stored analytical relationship information to the received one or more user inputs; and
displaying the computed prediction on the display of the computing device.

2. The method as claimed in claim 1, wherein the one or more analytical models are a Predictive Model Markup Language (PMML) model.

3. The method as claimed in claim 2, wherein the PMML model is generated using at least of: a Statistical Packages for Social Sciences (SPSS) model a Statistical Analysis System (SAS) model, an R model, and another statistical software tool capable of generating PMML models.

4. The method as claimed in claim 1, wherein the set of metadata tables and the set of relationship tables are stored in a memory unit.

5. The method as claimed in claim 1, wherein the plurality of analytical metadata comprises a plurality of variables with their dictionary information.

6. The method as claimed in claim 1, wherein the analytical relationship information of the analytical models comprises mathematical relationship information and logical relationship information.

7. The method as claimed in claim 1, wherein the scoring of the analytical model comprises at least one of a real time scoring and batch scoring.

8. The method as claimed in claim 7, wherein
the scoring is a batch scoring, and
the method further comprises:
receiving the one or more analytical models and one or more data sources associated with the received one or more analytical models by the server from the computing device, wherein the received one or more analytical models are provided by the user;
extracting the analytical relationship information from the received one or more analytical models by extracting a plurality of analytical metadata corresponding to the received one or more analytical models, wherein the extracted plurality of analytical metadata and the analytical relationship information are stored in the set of metadata tables and in the set of relationship tables respectively;
generating a Structured Query Language (SQL) structure based on the extracted analytical relationship information;
computing the prediction based on the scoring of the analytical model by applying the generated SQL to the received one or more data sources corresponding to the received one or more analytical models; and
displaying the computed prediction on the display of the computing device.

9. The method as claimed in claim 8, wherein the one or more data sources comprises at least one of: a Relational Database Management Systems (RDBMS), a flat file, an Excel file and a Java Database Connectivity (JDBC) data source.

10. A system comprising: a server comprising:
a memory; and
a processor couple coupled to the memory that is configured to:
receive one or more analytical models from a computing device;
parse the analytical models to extract a plurality of analytical metadata;
store, in the memory, the extracted plurality of analytical metadata in a created set of metadata tables;
extract analytical relationship information from the one or more analytical models based on the stored plurality of analytical metadata,
create a set of relationship tables to store the analytical relationship information;
dynamically generate a user interface comprising a plurality of data entry fields based on the stored plurality of analytical metadata;
display the generated user interface on a display of the computing device;

receive from a user of the computing device, one or more user inputs for the data entry fields of the dynamically generated user interface;

compute a prediction score based on a scoring of the analytical model by applying the stored analytical relationship information to the received one or more user inputs; and display the computed prediction on the display of the computing device.

11. The system as claimed in claim 10, wherein the processor further comprises:

a dictionary module to extract the analytical relationship information from the analytical model;

a user interface module to generate the user interface and to display the generated user interface on the computing device; and a scoring module to computer the prediction score of the analytical model.

12. The system as claimed in claim 10, wherein the processor further comprises a Structured Query Language (SQL) module for performing batch scoring for the one or more analytical models.

13. The system as claimed in claim 10, wherein the computing device comprises at least one of: a computer, a mobile phone, a Personal Digital Assistant (PDA), and any device capable of performing data transmission and display.

\* \* \* \* \*